(12) United States Patent
Archer et al.

(10) Patent No.: US 7,093,536 B1
(45) Date of Patent: Aug. 22, 2006

(54) FAULT TOLERANT OPERATING METHOD FOR A COTTON PACKAGER

(75) Inventors: Tracy R. Archer, West Liberty, IA (US); Yun-Ren Ho, Naperville, IL (US); Kevin D. McKee, Naperville, IL (US); Kevin S. Richman, Lititz, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/319,318

(22) Filed: Dec. 28, 2005

(51) Int. Cl.
*B30B 15/18* (2006.01)
*G08B 21/00* (2006.01)

(52) U.S. Cl. .......................... 100/35; 100/46; 100/49; 340/679; 340/689; 701/92; 56/28

(58) Field of Classification Search ............... 100/35, 100/43, 46, 49; 340/517, 679, 686.1, 689; 701/92, 97, 207, 214; 56/10.2 E, 28
See application file for complete search history.

(56) References Cited

U.S. PATENT DOCUMENTS

| | | | |
|---|---|---|---|
| 4,744,207 A | 5/1988 | Hanley et al. | 56/16.6 |
| 5,025,614 A | 6/1991 | Orsborn et al. | 56/10.2 |
| 5,787,378 A | 7/1998 | Schricker | 701/50 |
| 5,875,409 A | 2/1999 | Steeby et al. | 701/52 |
| 6,175,788 B1 | 1/2001 | Hasegawa et al. | 701/29 |
| 6,176,779 B1 | 1/2001 | Riesterer et al. | 460/119 |
| 6,212,483 B1 | 4/2001 | Carew et al. | 702/183 |
| 6,253,136 B1 | 6/2001 | Stratton et al. | 701/50 |
| 6,366,210 B1 | 4/2002 | Lemke | 340/665 |
| 6,941,208 B1 | 9/2005 | Mahoney et al. | 701/50 |
| 2003/0015846 A1 | 1/2003 | Rogala et al. | 280/5.514 |
| 2003/0047892 A1 | 3/2003 | Goddard | 280/5.514 |
| 2004/0215380 A1 | 10/2004 | Song | 701/37 |
| 2005/0217513 A1* | 10/2005 | Lemke et al. | 100/226 |

* cited by examiner

*Primary Examiner*—Derris H. Banks
*Assistant Examiner*—Jimmy T. Nguyen
(74) *Attorney, Agent, or Firm*—Michael G. Harms; John William Stader; Stephen A. Bucchianeri

(57) ABSTRACT

A fault tolerant operating method for a cotton compactor of a cotton module builder or packager of a cotton harvesting machine, which serves as an alternative to shutting down the compacting process or erratic operation thereof, in the event of indication of a fault or failure condition involving one or more sensors associated with the compactor, or a conductive path in connection with a sensor, all generally identified as a fault or failure condition.

7 Claims, 5 Drawing Sheets

FAULT TOLERANT OPERATING METHOD FOR A COTTON PACKAGER

TECHNICAL FIELD

This invention relates generally to control of a process for compacting and building a cotton module within a cotton packager or module builder, and more particularly, to control of a cotton module building process when one or more devices used in the process, such as a sensor, switch, or the like, is faulty, apparently faulty, or otherwise in a failure mode.

BACKGROUND ART

With a cotton module builder or packager on a cotton harvesting machine, parameters of the module building or packaging process, such as, but not limited to, the distribution of cotton within the module building chamber, the number of packing positions, and the number of compacting strokes, are all critical factors in forming a good rectangular module of compacted cotton that can be unloaded onto the ground as a stand alone module of cotton, and subsequently handled for transportation to the gin for processing. Steps of such module building or packaging processes are typically performed while harvesting cotton. As a result, it is preferred that such steps be conducted automatically, without requiring operator input or attention. If operation of the packager must be stopped, for instance, as a result of a fault or failure condition involving one or more sensors of the packager, or the compactor operates erratically, the harvesting operation will likely have to be stopped, resulting in costly downtime.

As is known, the distribution of the cotton within the module chamber is typically accomplished using augers attached to a compactor frame of a compactor movable upwardly and downwardly in the chamber. As cotton is being harvested and conveyed into the chamber, the augers are operated in a forward and/or a reverse direction for distributing the cotton in the chamber under the compactor. At times, the compactor is stroked or moved downwardly against the collected cotton, to compact it in the bottom of the chamber. A number of compacting positions are used to index or move the location of the compactor up within the chamber as the module is built from the bottom up. This ensures that there is space under the compactor in which to distribute the cotton.

The length of time that the augers run in the different directions, the number of compacting positions, and the number of compaction strokes before moving or indexing the compactor to the next position, are typically determined dependent upon input values for an electronic compaction program run by the compactor controller, these values being determined based on factors that typically include time, auger pressure, compactor pressure, level and distribution of cotton within the chamber, and the amount of cotton entering the chamber. The amount of cotton entering the chamber can vary as a result, for instance, of yield conditions, which, can vary even over a single cotton field. The amount of time the augers run forward and the amount of time they run rearward, the number of compactor positions and compacting strokes will usually be different for the different yield conditions, as well as other conditions, and will influence the distribution of cotton within the chamber.

The determinations by the compactor controller of the necessary duration and directions of auger operation, and whether movement to a new indexing position is necessary, are preferably automatically made, at least in part, based upon information as to the existing overall level and distribution of cotton within the chamber. This information is gathered from sensors, typically including compactor position sensors, a compactor pressure sensor, and auger pressure sensors. The compactor is preferably pivotable, and typically, two compactor position sensors are used, one for determining a position or height near a forward end of the compactor, and one near the rear end. Tilt is typically determined as a function of differences between the sensed positions, and is indicative of a higher level of cotton in the chamber adjacent to one end thereof. One or more compactor pressure sensors can be used to determine the extent to which the cotton is being compacted during the compacting strokes. One or more auger pressure sensors can be used for determining if cotton is accumulated to a greater extent toward one end of the chamber to thereby indicate need for reversal of auger direction, and for determining when compaction or indexing the compactor position is required.

As a result, in the event of a failure or faulty output or operation of one or more of the sensors, including of a conductive path connecting the sensor to the compactor controller for carrying sensor outputs to the controller, the information set for determining the next step of the compacting process will be incomplete. This can occur continuously, or in an erratic manner. In response, the controller can automatically shut down, or be shut down by the operator, but this will result in lost productivity as noted above, and is thus undesirable.

Thus, what is sought is an alternative to shut down of the compacting process when one or more sensor outputs is faulty or indicative of failure of the sensor or conductive path connecting the sensor to the controller.

SUMMARY OF THE INVENTION

What is disclosed is a fault tolerant operating method for a cotton compactor of a cotton module builder or packager of a cotton harvesting machine, which serves as an alternative to shutting down the compacting process or erratic operation thereof, in the event of indication of a fault or failure condition involving one or more sensors associated with the compactor, or a conductive path in connection with a sensor, all generally identified as a fault or failure condition.

According to a preferred aspect of the invention, a compactor controller is programmed to control the compactor, and is operable in several fault tolerant modes depending on the status of the sensor signals, including in a first fault tolerant mode if one or both compactor position sensors is faulty, a second fault tolerance mode in the event the compactor pressure sensor is faulty, and a third fault tolerance mode for a faulty auger pressure sensor.

According to one preferred method of operation, the compactor controller is operable for:

determining a first compactor position sensor value as a function of an output of a first compactor position sensor;

determining a second compactor position sensor value as a function of an output of a second compactor position sensor;

determining if the first compactor position sensor value is indicative of a failure condition, and, if yes, then setting the first compactor position sensor value equal to the second compactor position sensor value;

determining if the second compactor position sensor value is indicative of a failure condition, and, if yes, then setting the second compactor position sensor value equal to the first compactor position sensor value;

setting a compactor position value as:
a value which is a function of a sum of the first and second compactor position sensor values if neither or only one of the first and second position sensor values is indicative of the failure condition, or
a default value if both of the first and second position sensor values are indicative of the failure condition; and setting a compactor tilt value as:
a value which is a function of a difference between the first and second compactor position sensor values if neither or only one of the first and second position sensor values is indicative of the failure condition, or
a default value if both of the first and second position sensor values are indicative of the failure condition.

As a result, in the event of a fault or failure of one or both of the compactor position sensors, or of a conductive path connecting the sensor to the compactor controller, the compactor is still able to operate in an effective manner. The augers can be operated in default directions, and the compactor can operate in a timed loop.

According to another preferred aspect of the invention, the compactor pressure sensor is operable to sense pressure as the compactor compacts the cotton in the bottom of the chamber. During normal operation, the controller will raise the compactor if the compactor pressure exceeds a predetermined threshold. In the event of fault or failure of the compactor pressure sensor, for instance, if the signal from the compactor pressure sensor is not within a correct range, or is absent, the controller can be programmed to raise the compactor when the compactor lowering time exceeds a predetermined threshold.

According to another preferred aspect of the invention, the auger pressure sensor is operable to sense pressure as the auger or augers move or distribute cotton over the compacted cotton in the bottom of the chamber. During normal operation, the auger pressure signal is used as an index for lowering the compactor, and to determine at what level to raise the compactor above the compacted cotton. In the event of fault or failure of the auger pressure sensor, for instance, if the signal from the auger pressure sensor is not within a correct range, or is absent, the controller can be programmed to lower the compactor when the time for staying above the cotton exceeds a predetermined threshold.

According to still another preferred aspect of the invention, the controller is programmed to check the operability or status of critical operator switches during key up or start up, such as, but not limited to, a door open operator switch, a door close operator switch, a fire unload operator switch, and an unload chain operator switch, and if one or more of the switches is faulty, to prevent execution of the commanded operation, and output or display a message or error signal to the operator, to turn off the switch and/or check the wiring harness, connections, and/or to take other troubleshooting steps.

DETAILED DESCRIPTION OF THE INVENTION

Figure 1:
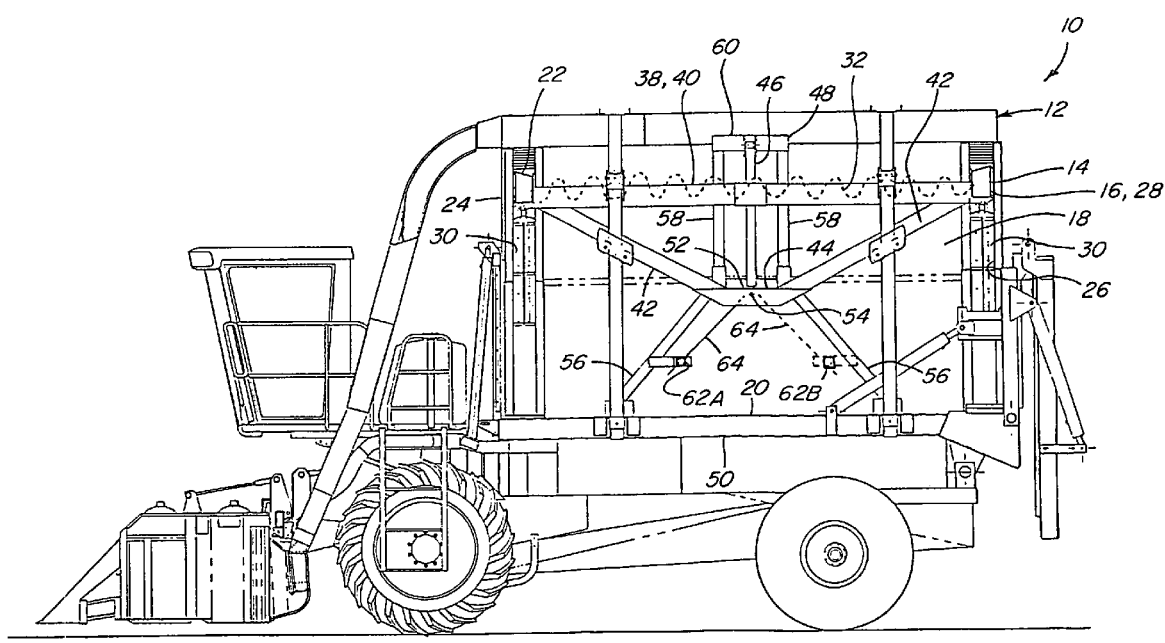
FIG. 1 is a side view of a cotton harvester including an on-board cotton module builder or packager operable according to the method of the invention.

Turning now to the drawings, in FIG. 1, a cotton harvester 10 is shown, including an on-board cotton packager or module builder 12 for compacting cotton harvested by harvester 10 into a unitary cotton module (not shown).

Figure 2:
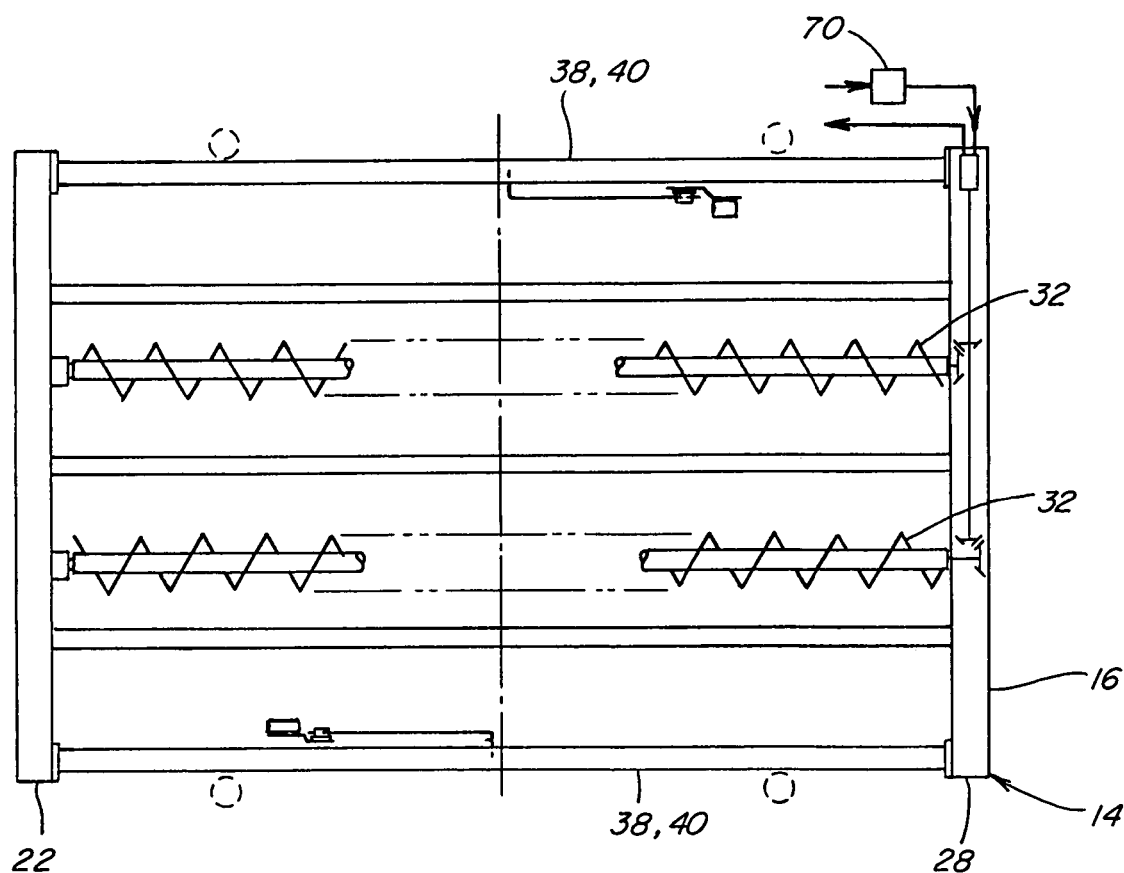
FIG. 2 is a simplified schematic top view of compactor of the cotton harvester of FIG. 1.

Referring also to FIG. 2, a compactor 14 operable according to the present invention is shown. Compactor 14 includes a compactor frame 16 which is oriented generally horizontally, or within a range of small acute angles relative to horizontal, and substantially entirely disposed within a compactor chamber 18, for movement downwardly against cotton contained therein for compacting the cotton against a floor 20 therein. Compactor frame 16 includes a front cross member 22 disposed in chamber 18 adjacent a front wall 24, and having opposite ends which extends through sidewardly open slots 26 in the sides of module builder 12. Similarly, a rear cross member 28 is disposed in chamber 18 and has opposite end portions which extend through slots 30 in sides of module builder 12. Augers 32 are supported in forward and rearward extending relation between cross members 22 and 28 within chamber 18. Augers 32 can be rotated using any suitable commercially available drivers, such as a gear drive driven by a motor such as a fluid or electric motor, or directly by fluid or electric motors, as desired, and as controlled by an auger on solenoid 34 and an auger reverse solenoid 36 (FIG. 3), for distributing the collected cotton in chamber 18 as will be explained. In this regard, it should be noted that it is desirable and a sought after feature to distribute the cotton evenly with respect to the plane of floor 20, such that the resultant compacted cotton module will have a substantially uniform height along its length and width.

Compactor frame 16 of compactor 14 is supported in compacting chamber 18 on each side by an exterior side structure 38, each structure 38 including a forwardly and rearwardly extending main beam 40 which extends between and connects front and rear cross members 22 and 28. Each side structure 38 additionally includes a pair of braces 42 which extend downwardly and at converging angles from front and rear cross members 22 and 28, and which are connected together by a gusset 44 located spacedly below about the middle of main beam 40. Here, it should be noted that compactor frame 16 located within compacting chamber 18 and exterior side structures 38 on the exterior of module builder 12 are movable upwardly and downwardly together.

The upward and downward movement of exterior side structures 38 and compactor frame 16 is preferably achieved and controlled by fluid cylinders 46 extending, respectively, between gussets 44 of each exterior side structure 38 and a support frame 48 supported by and extending upwardly from a frame 50 of module builder 12. Importantly, a rod 52 of each cylinder 46 is connected to gusset 44 at a pivot 54 which allows limited pivotal movement of side structure 38 and thus compactor frame 16 and augers 32 of compactor 14 about a side-to-side extending pivotal axis within a limited range of pivotal movement.

Support frame 48 on each side of module builder 12 includes a pair of diagonally extending braces 56 having lower ends connected to frame 50, and upper ends which connect to and support vertical braces 58 which support a cross member 60 to which fluid cylinder 46 is attached. A more forward brace 56 of support frame 48 on that side of module builder 12 facing outwardly from the page, and the more rearwardly located brace 56 on the opposite side of the module builder, support forward and rear compactor position sensors 62A and 62B, respectively. Each compactor position sensor 62A and 62B includes an elongate actuator arm 64 which pivotally connects to gusset 44 on that side of the module builder. Each sensor 62A and 62B is a rotary type sensor, which will detect rotational movement of the respective actuator arm 64, as compactor 14 is moved from the position shown in FIG. 1, for instance, to any of several lowered positions (not shown). Because two compactor position sensors 62A and 62B are used, movements of compactor 14 at a tilt will result in different rotational displacements of actuator arms 64 of the respective sensors 62A and 62B, and thus the sensors will output different positional values. The difference between these positional values can be utilized for determining both the vertical position of compactor 14, and also any tilt thereof. Compactor position sensors can include, for instance, potentiometers, which vary a voltage or current signal when an input thereof is rotated. Actuator arms 64 can be slidable relative to the input to prevent binding when rotated. For instance, a vertical position of the compactor can be determined as a function of a sum of the values outputted by sensors 62A and 62B, such as by averaging the values.

Figure 3:
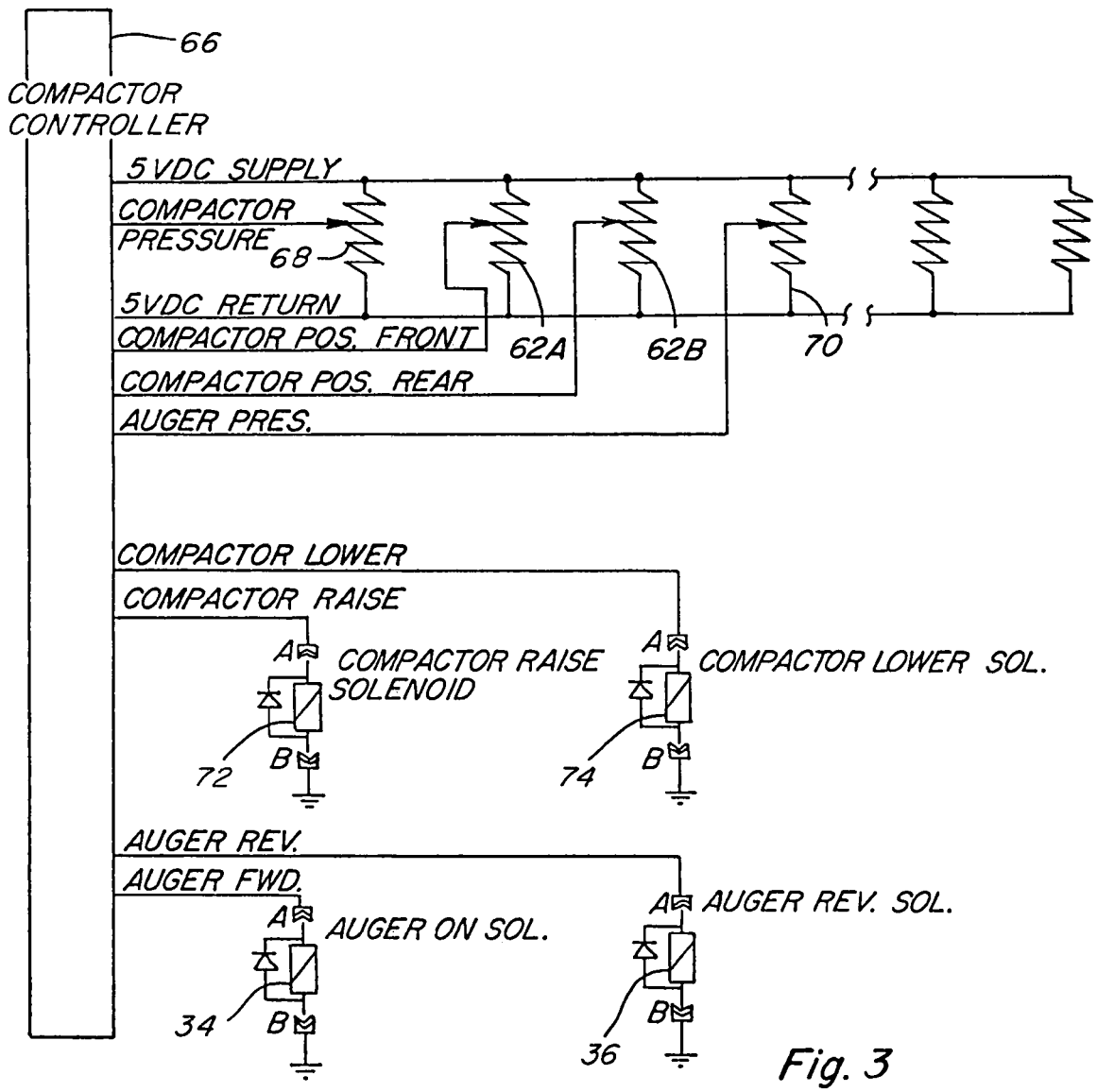
FIG. 3 is a simplified schematic diagram of a cotton packager controller operable using methods according to the invention.

Referring also to FIG. 3, a compactor controller 66 of packager 12 is operable for receiving signals outputted by a number of devices, including, but not limited to, a compactor pressure signal from a compactor pressure sensor 68, two compactor position signals outputted by compactor position sensors 62A and 62B, auger pressure signals outputted by an auger pressure sensor 70, and one or more additional signals outputted by various sensors or other devices. Controller 66 can be connected to the sensors using any suitable conductive paths, such as, but not limited to, a conventional wiring harness, optical cables, a wireless network, or the like. Responsive to the signals from these devices, and/or other devices, controller 66 is operable for automatically responsively outputting signals to apparatus such as a compactor raise solenoid 72 and a compactor lower solenoid 74, which control fluid cylinders 46 (FIG. 1) operable for moving compactor 14 upwardly and downwardly against cotton accumulated in a bottom region of compactor chamber 18. The cylinders 46 can also be used for setting or indexing the compactor position. Compactor controller 66 is also operable for outputting signals to augers 32 (FIGS. 1 and 2), for effecting forward or reverse rotation thereof via auger on solenoid 34 and auger reverse solenoid 36, and to other suitable devices.

As indicated above, compactor controller 66 is preferably programmed for automatically controlling compactor and auger operation for building a compacted cotton module within compactor chamber 18, as a function of the outputs from the sensors, time, and other parameters, as harvester 10 is operating. However, failure or fault of a sensor or sensors, and/or of the conductive path connecting a sensor or sensors to controller 66, either of a continuous, intermittent, or erratic manner, could result in a lack of complete data required for normal automatic programmed operation of compactor 14. As a result, compactor 14 could be shut down, either automatically or by an operator, to allow diagnosis and correction of the failure or fault, thereby interrupting the harvesting operation. The methods of the present invention provide alternatives to allow continued operation of the compactor under several sensor fault or failure conditions.

Figure 4:
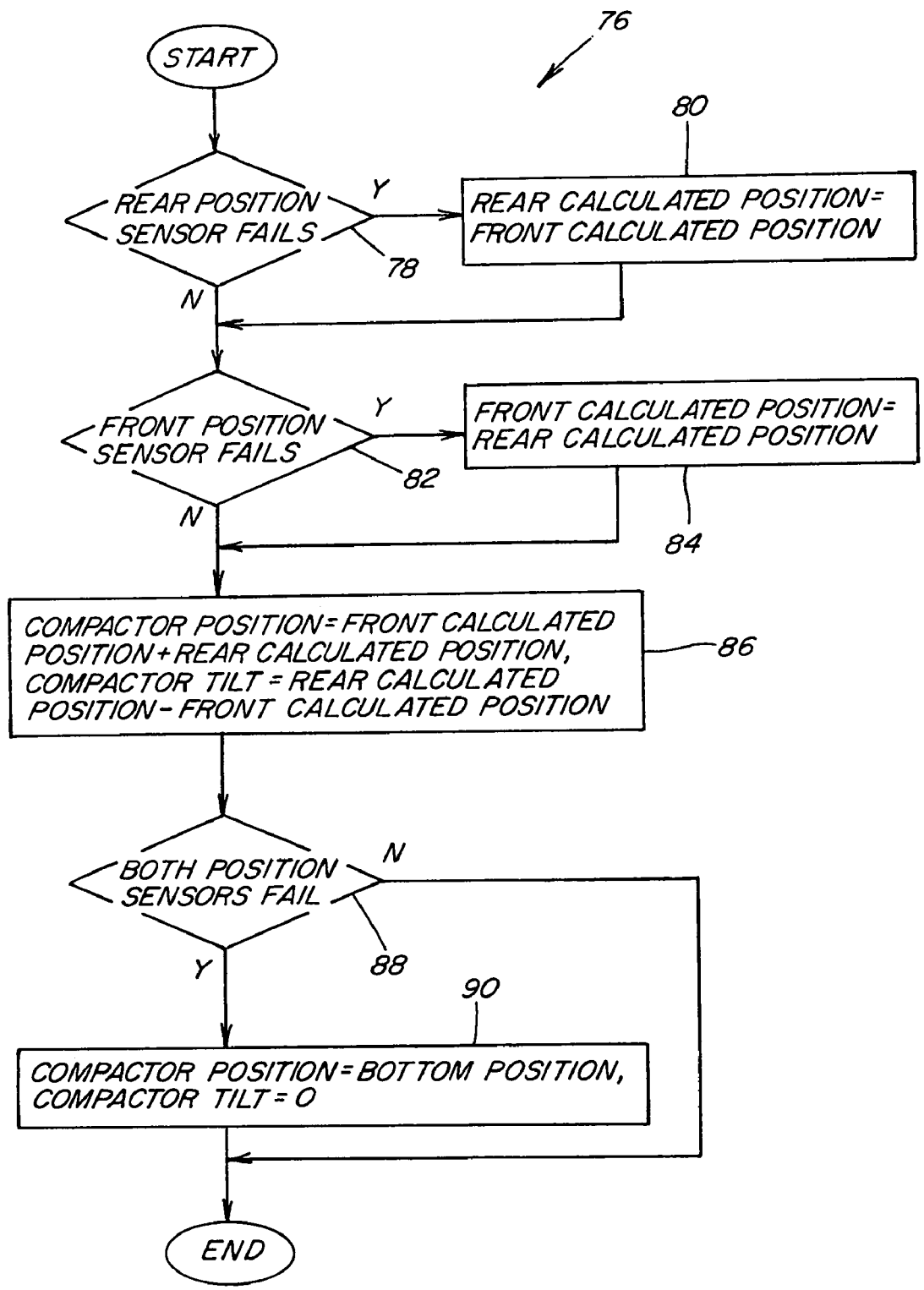
FIG. 4 is a high level flow diagram showing steps for operation of the controller according to one of the methods of the invention.

Referring also to FIG. 4, a high level flow diagram 76 is shown, including preferred steps for operation of compactor controller 66 in a fault tolerant mode, wherein one or both compactor position sensors 62A and 62B have failed or are faulty, and/or a conductive path in connection therewith is faulty. In this mode, controller 66 will determine or set a compactor position value, that is, the position of compactor 14 in relation to some reference, and a compactor tilt value, if any, for use, for instance, in determining the location of compactor 14 in chamber 18, or whether a movement or indexing of compactor 14 is required. At decision block 78, controller 66 determines if there is a failure or fault with rear compactor position sensor 62B. This can be determined from outputs from the sensor, or lack thereof. For instance, a value of an output from the signal can be outside of prescribed range of values, or above or below some prescribed threshold. If a fault is determined, controller 66 will set a rear calculated compactor position value equal to a front calculated compactor position value, as denoted at block 80. If no fault is determined, controller 66 proceeds to determine if there is a failure or fault with front compactor position sensor 62A, as denoted at decision block 82. This determination can be made based on the same or different parameters as those used for determining a fault of sensor 62B. If a fault is determined, controller 66 sets the front calculated compactor position value equal to the rear calculated compactor position value, as denoted at block 84. If no fault is determined, controller 66 will proceed to set or determine a compactor position value equal to a value which is a function of a sum of the front calculated compactor position value and the rear calculated compactor position value, as denoted at block 86. For instance, an average of the position values can be calculated. Additionally, controller 66 will set a compactor tilt value equal to a value which is a function of a difference between the rear calculated compactor position value and the front calculated compactor position value. As denoted at decision block 88, if controller 66 determines that a failure or fault condition exists in regard to both sensors 62A and 62B, it will set the compactor position value equal to a default value, which is preferably a bottom position for the compactor, and will set the compactor tilt value equal to a default value, which is preferably zero tilt, as denoted at block 90. If, at decision block 88, controller 66 determines that there is no failure of both sensors 62A and 62B, the compactor position and tilt values set as indicated in block 86 will be used.

As a result, in the event of a fault or failure of one or both of compactor position sensors 62A and 62B, or of a conductive path connecting sensors 62A and 62B to controller 66, a compactor position value is determined, such that compactor 14 is still able to operate in a reasonably effective manner. For instance, even if compactor 14 is tilted but a sensor failure makes it impossible to determine the existence of the tilt, controller 66 can operate augers 32 in a default mode. As an example, the augers can be operated in one direction for a first operating period, then reversed and operated in the opposite direction for another time period, such that at least some additional distribution of cotton beneath the compactor will occur before the next compacting operation. A default compaction stroking routine can also be used, such that the cotton in the bottom of the chamber can be compacted to at least some extent, to facilitate receipt of additional cotton into the chamber during continued harvesting. Thus, although optimal module building may not occur in the event of failure of one or both of the compactor position sensors 62A and 62B, a reasonably effective compaction routine is provided.

Figure 5:
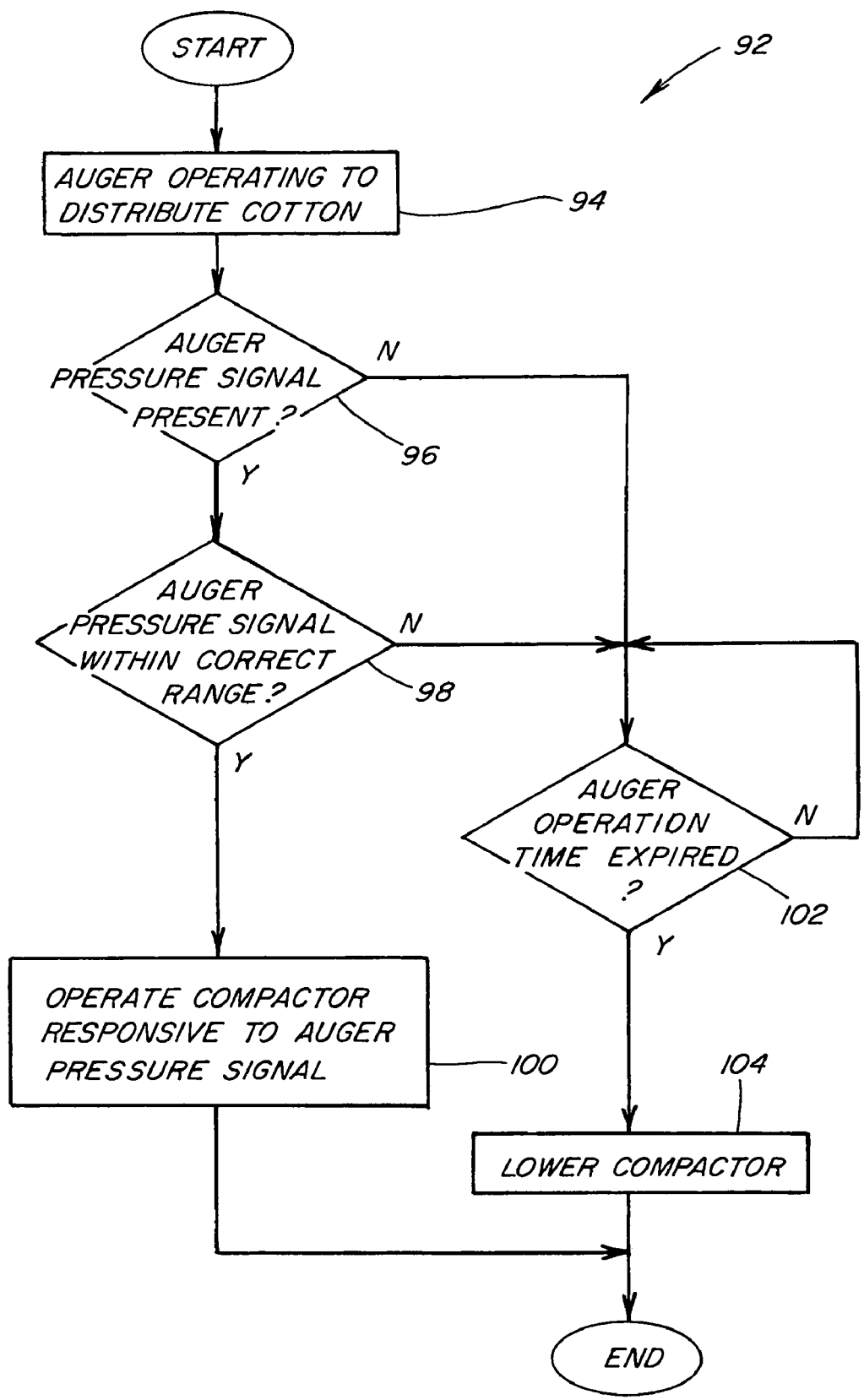
FIG. 5 is another high level flow diagram showing steps for operation of the controller according to another method of the invention.

Referring also to FIG. 5, a high level flow diagram is shown, including preferred steps for operation of compactor controller 66 in a fault tolerant mode in the event of a faulty auger pressure signal, or absence thereof. At block 94, augers 32 are operating to distribute cotton within compactor chamber 18. Controller 66 will determine if an auger pressure signal is present, as denoted at decision block 96. If yes, controller 66 will determine whether the signal is good, for instance, within a predetermined or correct value range, as denoted at block 98. If yes, controller 66 will operate the compactor in the normal manner, for instance, responsive to auger pressure signals, as denoted at block 100. Returning to decision blocks 96 and 98, if controller 66 determines that the auger pressure signal is not present, or is not within the correct range, controller 66 will operate in a fault tolerance mode, which can involve, for instance, operation of augers 32 for a predetermined auger operation time period. Controller 66 will time the operation, and determine when the auger operation time is expired, as denoted at decision block 102, then will proceed to lower the compactor to perform one or more compacting strokes, as denoted at block 104.

During normal operation, controller 66 will raise the compactor if the compactor pressure exceeds a predetermined threshold. In the event of fault or failure of the compactor pressure sensor 68, for instance, if the signal from compactor pressure sensor 68 is not within a correct range, or is absent, controller 66 can be programmed to operate in a mode tolerant of this fault, for instance, to raise compactor 14 when a prescribed compactor lowering time exceeds a predetermined threshold.

Still further, there are some fault conditions wherein continued operation is not desirable until the fault is corrected. For instance, in this regard, controller 66 can be programmed to check the operability or status of critical operator switches during key up or start up, such as, but not limited to, a door open operator switch, a door close operator switch, a fire unload operator switch, and an unload chain operator switch (not shown), and if one or more of the switches is faulty, to prevent execution of the operation commanded by the switch, and output or display a message or error signal to the operator, to turn off the switch and/or check the wiring harness, connections, and/or to take other troubleshooting steps.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates several preferred embodiments of methods of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of a cotton compactor of a cotton packager, comprising steps of:
   determining a first compactor position sensor value as a function of an output of a first compactor position sensor;
   determining a second compactor position sensor value as a function of an output of a second compactor position sensor;
   determining if the first compactor position sensor value is indicative of a failure condition, and, if yes, then setting the first compactor position sensor value equal to the second compactor position sensor value;
   determining if the second compactor position sensor value is indicative of a failure condition, and, if yes, then setting the second compactor position sensor value equal to the first compactor position sensor value;
   setting a compactor position value as:
      a value which is a function of a sum of the first and second compactor position sensor values if neither or only one of the first and second position sensor values is indicative of the failure condition, or
      a default value if both of the first and second position sensor values are indicative of the failure condition; and
   setting a compactor tilt value as:
      a value which is a function of a difference between the first and second compactor position sensor values if neither or only one of the first and second position sensor values is indicative of the failure condition, or
      a default value if both of the first and second position sensor values are indicative of the failure condition
   when the compactor is compacting cotton therebeneath, determining whether a compactor pressure signal is present, and, if yes, then
   determining if the compactor pressure signal is within a correct range, and, if yes, then operating the compactor responsive to the compactor pressure signal, and if the compactor pressure signal is not present, or is not within the correct range, then raising the compactor after a compactor operation time period has expired.

2. The method of claim 1, wherein each of the failure conditions comprise an output having a value which is outside of a predetermined range, or absence of an output from one of the compactor position sensors.

3. The method of claim 1, wherein the default value for the compactor position value comprises a value for a bottom position of the compactor.

4. The method of claim 1, wherein the default value for the compactor tilt value comprises a zero tilt value.

5. The method of claim 1, further comprising a step of determining a position to which the compactor is to be moved as a function of the set compactor position value.

6. The method of claim 1 comprising additional steps of:
   when an auger of the compactor is operating, determining whether an auger pressure signal is present, and, if yes, then
   determining if the auger pressure signal is within a correct range, and, if yes, then operating the compactor responsive to the auger pressure signal, and if the auger pressure signal is not present, or the auger pressure signal is not within the correct range, then lowering the compactor after an auger operation time has expired.

7. A method of operation of a cotton compactor of a cotton packager in a fault tolerant mode responsive to at least one faulty or absent compactor position sensor signal, comprising steps of:
   moving the compactor to compact cotton therebeneath;
   if one compactor position sensor signal is faulty or absent, then substituting a value representative of another compactor position sensor signal for a value of the faulty or absent compactor position sensor signal and calculating a compactor position value using the value substituted for the value of the faulty or absent compactor position sensor signal;

if more than one compactor signal is faulty or absent, then setting the compactor position value equal to a default value if one compactor position sensor signal is faulty or absent, then substituting a value representative of another compactor position sensor signal for a value of the faulty or absent compactor position sensor signal and calculating a compactor tilt value using the value substituted for the value of the faulty or absent compactor position sensor signal; and if more than one compactor signal is faulty or absent, then setting the compactor tilt value equal to a default value.

* * * * *